(12) United States Patent
Adams et al.

(10) Patent No.: US 7,469,074 B2
(45) Date of Patent: Dec. 23, 2008

(54) METHOD FOR PRODUCING A COMPOSITE IMAGE BY PROCESSING SOURCE IMAGES TO ALIGN REFERENCE POINTS

(75) Inventors: Stephen Paul Adams, Lexington, KY (US); Russell Hugh Robbins, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 718 days.

(21) Appl. No.: 10/991,252

(22) Filed: Nov. 17, 2004

(65) Prior Publication Data

US 2006/0115180 A1    Jun. 1, 2006

(51) Int. Cl.
*G06K 9/36*    (2006.01)
(52) U.S. Cl. .................. 382/284; 382/282; 382/294; 358/540; 358/450
(58) Field of Classification Search ............... 382/282, 382/284, 294, 298; 358/538, 540, 450
See application file for complete search history.

(56) References Cited

U.S. PATENT DOCUMENTS

| | | | |
|---|---|---|---|
| 4,394,693 A | 7/1983 | Shirley | |
| 4,484,347 A | 11/1984 | Kashioka | |
| 4,679,155 A | 7/1987 | Mitsuka | |
| 5,491,777 A * | 2/1996 | Mase et al. ................ | 463/31 |
| 5,537,662 A * | 7/1996 | Sato et al. ................ | 715/860 |
| 5,649,032 A | 7/1997 | Burt et al. | |
| 5,696,995 A | 12/1997 | Huang et al. | |
| 5,787,419 A * | 7/1998 | Sato et al. ................ | 707/4 |
| 5,956,083 A * | 9/1999 | Taylor et al. ............ | 348/231.6 |
| 6,229,904 B1 | 5/2001 | Huang et al. | |
| 6,268,846 B1 | 7/2001 | Georgiev | |
| 6,272,231 B1 * | 8/2001 | Maurer et al. ............ | 382/103 |
| 6,278,451 B1 * | 8/2001 | Suzuki .................. | 715/764 |
| 6,314,197 B1 | 11/2001 | Jain et al. | |
| 6,449,398 B1 | 9/2002 | Gennetten | |
| 6,463,163 B1 * | 10/2002 | Kresch .................. | 382/103 |
| 6,496,594 B1 * | 12/2002 | Prokoski ................ | 382/118 |
| 6,591,011 B1 | 7/2003 | Nielsen | |
| 6,611,613 B1 * | 8/2003 | Kang et al. ............. | 382/118 |
| 6,650,791 B1 | 11/2003 | Cullen | |
| 6,654,018 B1 * | 11/2003 | Cosatto et al. ........... | 345/473 |
| 6,704,041 B2 | 3/2004 | Katayama et al. | |
| 6,724,948 B1 | 4/2004 | Lippincott | |
| 6,751,340 B2 | 6/2004 | Prokoski | |
| 6,785,427 B1 | 8/2004 | Zhou | |
| 7,027,054 B1 * | 4/2006 | Cheiky et al. ........... | 345/473 |

* cited by examiner

*Primary Examiner*—Yosef Kassa
(74) *Attorney, Agent, or Firm*—Neill R. Kahle, Jr.

(57) ABSTRACT

A method is described for producing a composite image that is viewable through lenticular lenses to create a special visual effect. The method includes the steps of storing a first source image and a second source image and selecting a pair of reference points in the first source image and corresponding reference points in the second source image. First and second intermediate images are created such that objects in the source images are better aligned, and the intermediate images are interlaced to produce the composite image.

19 Claims, 4 Drawing Sheets

FIRST SOURCE IMAGE

SECOND SOURCE IMAGE

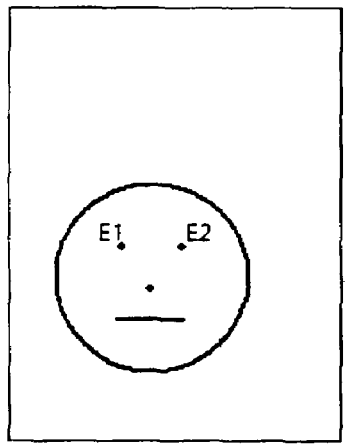
FIRST SOURCE IMAGE
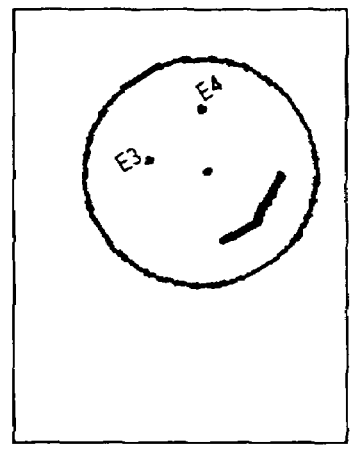
SECOND SOURCE IMAGE
FIGURE 3
FIGURE 4
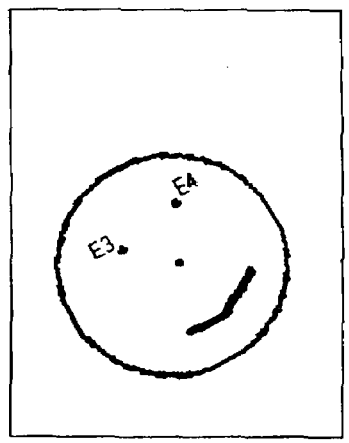
(a)
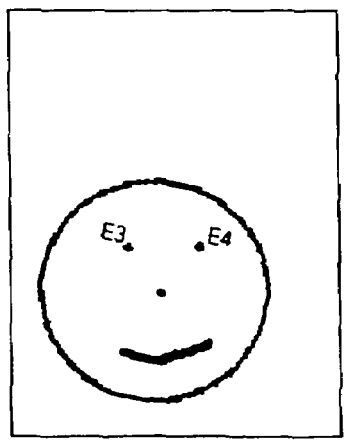
(b)
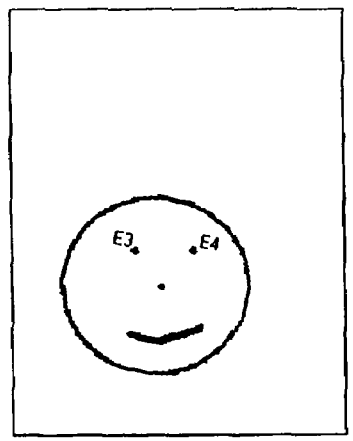
(c)

FIRST INTERMEDIATE IMAGE        SECOND INTERMEDIATE IMAGE

METHOD FOR PRODUCING A COMPOSITE IMAGE BY PROCESSING SOURCE IMAGES TO ALIGN REFERENCE POINTS

FIELD OF THE INVENTION

The present invention relates generally to a method for producing a composite or interlaced image by processing image data corresponding to two or more source images. In particular, it relates to processing the image data to align two selected reference points in the first source image with corresponding reference points in the second source image.

BACKGROUND OF THE INVENTION

It is known to print a composite or interlaced image on a sheet of material and then overlay a transparent lenticular sheet in order to achieve one of several special visual effects. A composite image comprises a plurality of interlaced image slices, wherein the slices are portions of two or more different source images. A lenticular sheet includes a plurality of parallel semi-cylindrical lenses, or lenticules, and the image slices are aligned with the lenticules. Alternatively, a composite image can be printed directly on the backside of a transparent lenticular sheet.

The different special effects that can be obtained by viewing a composite image through the lenticular lenses include, for example, a three-dimensional effect, motion of an object, morphing between two different images, and flipping between distinct images. For example, a composite image can be created by interlacing slices of source images that are different perspective views of an object. Viewing such a composite image through a lenticular sheet creates a three dimensional effect due to the parallax shift between the images viewed by each eye. If a composite image is created by interlacing source images of an object at sequential points in time, viewing that image through a lenticular sheet conveys an impression of motion as the position of the viewer changes with respect to the lenticular sheet. Similarly, if a composite image is created by interlacing different source images of one or more faces, for example, viewing the composite image through a lenticular sheet creates a morphing effect as the position of the viewer changes with respect to the lenticular sheet. Similarly, a flip effect can occur by viewing a composite image that is created from dissimilar source images.

SUMMARY OF THE INVENTION

The invention provides a method for producing a composite image that is viewable through lenticular lenses to create a special visual effect. The method includes the steps of storing a first source image and a second source image, displaying the first and second source images, and selecting two reference points E1 and E2 in the first source image and corresponding reference points E3 and E4 in the second source image. A first intermediate image including points E1 and E2 that is a version of the first source image and a second intermediate image including points E3 and E4 that is a version of the second source image are created. The location of point E1 in the first intermediate image is the same as the location of point E3 in the second intermediate image, and the location of point E2 in the first intermediate image is the same as the location of point E4 in the second intermediate image. The first intermediate image and the second intermediate image are then interlaced to produce the composite image.

Other features and advantages of the invention will become apparent to those skilled in the art upon review of the following detailed description, claims, and drawings.

BRIEF DESCRIPTION OF THE DRAWINGS

FIG. 3 illustrates two source images with chosen labelled reference points that are not aligned;

FIGS. 4(a)-(c) illustrate various points in the processing of a second source image to produce an intermediate image;

DETAILED DESCRIPTION OF THE PREFERED EMBODIMENTS

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The order of limitations specified in any method claims does not imply that the steps or acts set forth therein must be performed in that order, unless an order is explicitly set forth in the specification. In addition, it should be noted that a plurality of hardware and software-based devices, as well as a plurality of different structural components, may be utilized to implement the invention.

Figure 1:
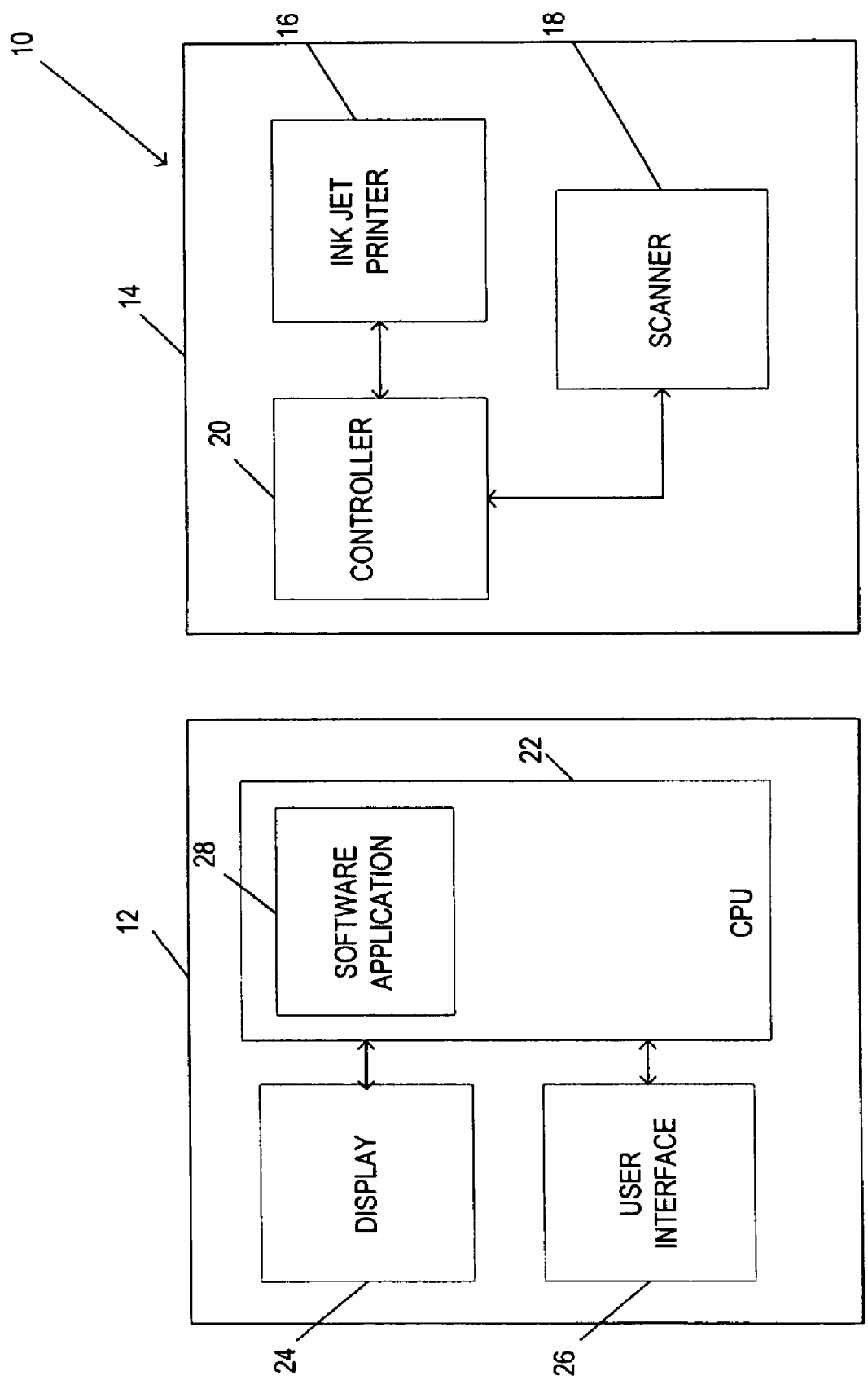
FIG. 1 illustrates one embodiment of a system for implementing a method for producing a composite image.

FIG. 1 illustrates one embodiment of a system 10 for implementing a method of producing a composite image. In particular, system 10 includes a computer 12, such a personal computer, connected to device 14, such as an all-in-one device including an inkjet printer 16, a scanner 18, and controller 20. Computer 12 includes a CPU 22, a display 24, such as a monitor, and a user interface 26, such as a keyboard, a mouse or the like. CPU 22 runs a software application 28.

A general overview of one embodiment of a method for producing a composite image and printing it on a lenticular sheet follows. A composite image can be generated in the form of an image data file by a software application 28 running on computer 12, by interlacing two or more intermediate images, which are in turn produced from a set of source images and a desired visual effect. In one embodiment, a user inputs the source images to the computer and selects via the user interface a desired visual effect, such as morph or 3D. The user may also have the ability to select a desired page layout of the composite image, and then print the composite image. The composite image can be printed using the inkjet printer 16, for example, directly on the backside of a lenticular sheet (i.e, the side of the sheet opposite the lenticules). Achieving a desired lenticular effect depends on printing the interlaced image so that the image slices are precisely aligned with respect to the lenticules of the lenticular medium. Lenticular sheets are generally available with lenticules at such resolutions as 60 lines per inch or 100 lines per inch, and inkjet printers are typically available at printing resolutions such as 600 dots per inch. When the composite image is printed on the lenticular sheet, depending on the angle of view, one of the intermediate images will be viewable.

Changing the angle of view allows a viewer to switch between the different intermediate images.

Especially when the desired visual effect from an interlaced image viewed through lenticular lenses is a blend or morph effect (as a viewer's eyes are moved relative to the lenses), it is desirable that common features in the two or more images making up the interlaced image are aligned. Alignment of common features in these images provides the best visual effect, and prevents the disjointed sensation of viewing objects having different sizes.

Figure 2:
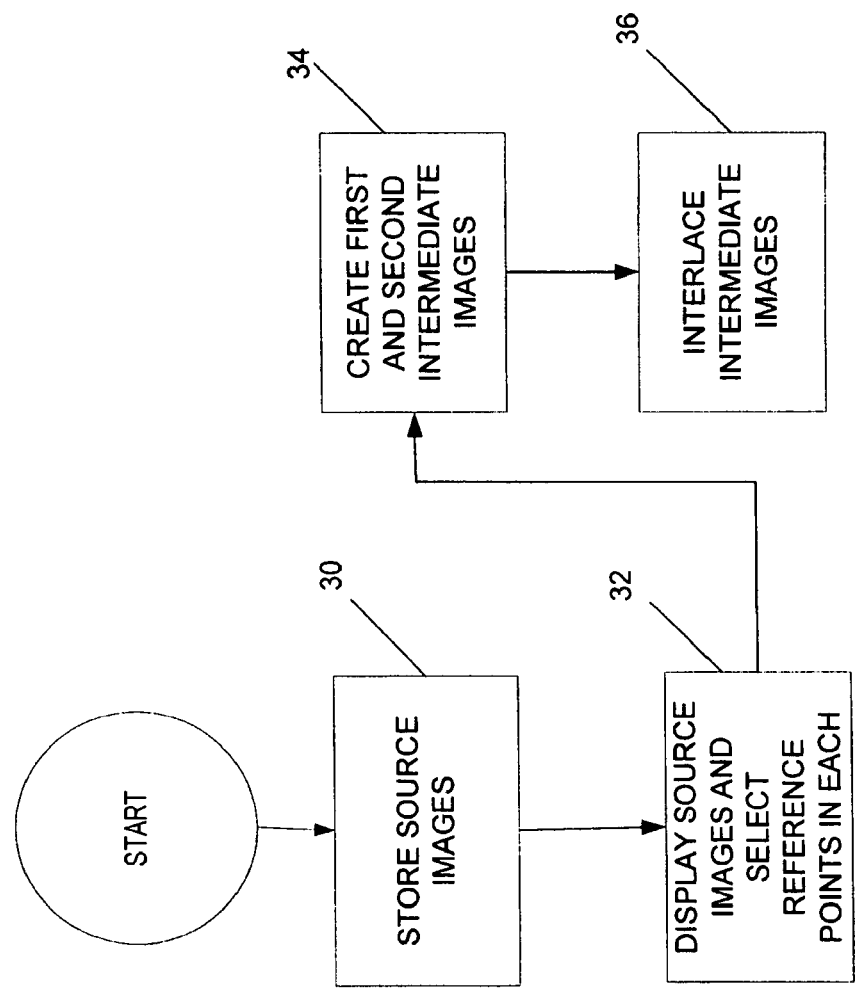
FIG. 2 illustrates a method for producing a composite image.

One embodiment of a method for producing a composite image that matches relevant features between two or more source images is described with respect to FIG. 2. In particular, at step 30, selected source images are stored. For example, a user may use the scanner 18 to input two selected photographs to the computer 12.

At step 32, the source images are then displayed and reference points on each are selected. In one embodiment, the source images are displayed on the computer display 24, and using the user interface, the user can select two reference points on the first source image and two corresponding reference points on the second source image. For example, referring to FIG. 3, labelled points E1 and E2 are selected from the first source image, and corresponding points E3 and E4 are selected from the second source image. In this example, the selected source images are each images of a person (the same or different), and the reference points selected are facial features, such as eyes, which are easy to identify both in the first and second source image.

At step 34, first and second intermediate images are created such that the first set of selected reference points are at the same location in the first intermediate image as are the second set of reference points in the second intermediate image. At step 36, the intermediate images are interlaced to create a composite image. By performing these steps, objects (such as faces) in the intermediate images can be made to be substantially the same size, and the resultant composite image will present a more pleasing effect when viewed through lenticular lenses as compared to having different sized objects making up the composite image.

The source images stored on the computer are in the form of image data files such as arrays. Each data file includes a plurality of pixels each having an associated color value. In one embodiment, the first intermediate image created is simply the first source image without any modification. In this case, processing occurs with respect to the second source image, as illustrated in FIGS. 4(a)-4(c). Different versions of the second source image are produced, each including points E3 and E4. Note, these points are labelled for purposes of explanation and the labels are not included in the actual intermediate images. For example, the pixel coordinates of the reference points within the data array are determined and the second source image is translated (shifted) to produce a translated data file where point E3 is at the same location within the translated image as point E1 is within the first source image. This translated image is shown in FIG. 4(a). Then, the translated image is rotated by an amount to produce a rotated image as shown in FIG. 4(b) such that a line defined by points E3 and E4 in the rotated image is in the same location in the rotated image as is a line defined by points E1 and E2 in the first source image (i.e., the first intermediate image in this example). Finally, the rotated image is resized so that the line segment defined by points E3 and E4 in the resultant resized image is the same length as the line segment defined by points E1 and E2 in the first source image. This resized image is shown in FIG. 4(c).

Figure 5:
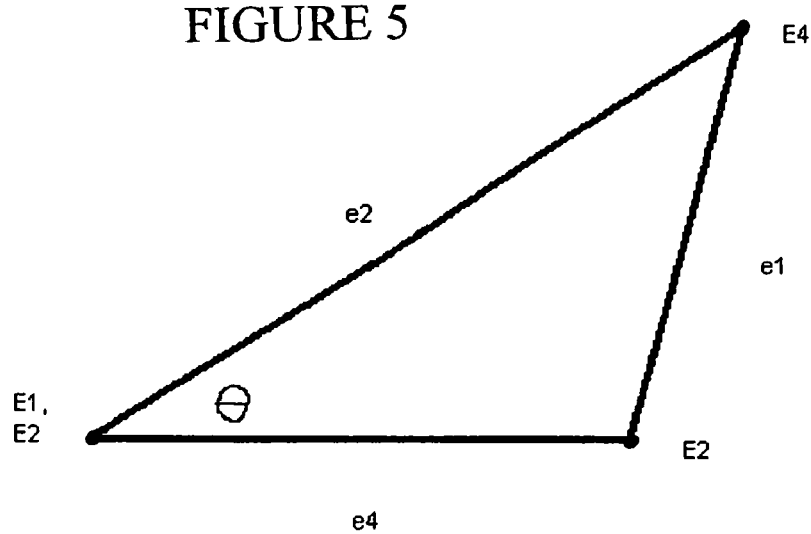
FIG. 5 illustrates the angle of rotation required.

The amount of the rotation required between the translated image and the rotated image can be determined with reference to FIG. 5. The angle $\Theta$ illustrates the amount of rotation required. The (x,y) coordinates for the points E1, E2 (from the first source image) and points E3 and E4 (from the translated image) are respectively denoted (x1, y1), (x2, y2), (x3, y3) and (x4, y4). Note that the translated image has moved E3 to E1 such that x1=x3 and y1=y3. Thus, distance e1 between point E2 and E4 can be determined:

$$e1 = \sqrt{(x4-x2)^2 + (y4-y2)^2}$$

Similarly, distances e2 and e4 can be determined:

$$e2 = \sqrt{(x4-x1)^2 + (y4-y1)^2}$$

$$e4 = \sqrt{(x2-x1)^2 + (y2-y1)^2}$$

Then, using the law of cosines:

$$\cos\theta = \frac{e2^2 + e4^2 - e1^2}{2 * e2 * e4}$$

Using the inverse cosine allows for the determination of angle θ, and image 2 is rotated (in this case in a clockwise direction) by this amount to produce the image illustrated in FIG. 4(b).

With respect to the amount of resizing required, this is determined by a ratio of line segments. In the example shown, the image illustrated in FIG. 4(b) is reduced by the ratio of e4/e2 to produce the image illustrated in FIG. 4(c).

Figure 6:
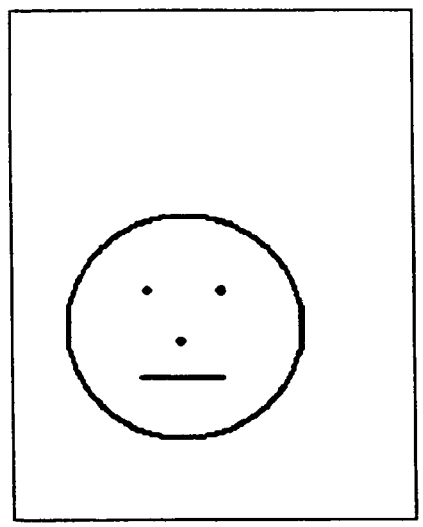
FIG. 6 illustrates two intermediate images with aligned reference points.
Figure 6:
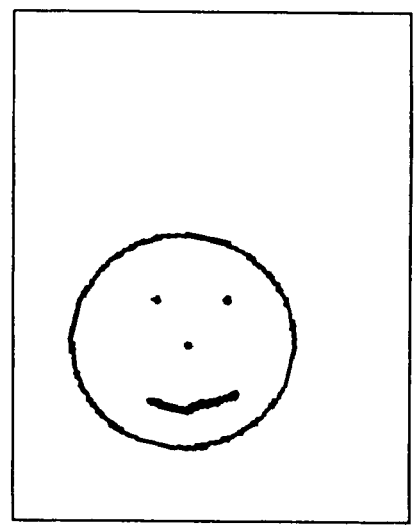

The first intermediate image and the second intermediate image for one embodiment are illustrated in FIG. 6. In this embodiment, the first intermediate image is the same as the first source image illustrated in FIG. 3, and the second intermediate image is the same as the image illustrated in FIG. 4(c). However, in other embodiments, the first and second intermediate images could include further resizing and/or cropping of the first source image and the image illustrated in FIG. 4(c). Resizing and/or cropping could also be first performed on the first and second source images prior to the translating, rotating and resizing steps described. This would create intermediate images having the requisite size and pixel resolution. For example, creating the intermediate images could also include a determination of an appropriate data file size (in number of pixels) that is necessary taking into account the resolution of the printer (in dots per unit width), lenticular lens spacing (in lenses per unit width), number of selected source images, and desired size of the printed composite image.

Further, it is important to note that in other embodiments, the translating, rotating, and resizing steps can be performed in a different order, on the first source image rather than the second source image, or on a combination of these. For example, the translating step could be performed using the first source image, and the rotating and resizing steps performed on the second source image. Similarly, the translating and rotating steps can be performed on the first source image, with the resizing step performed on the second source image. Other possibilities exist as well.

Clearly, these steps can also be repeated to create three or more intermediate images to generate the composite image in the event that three or more source images are desired.

Once the intermediate images are created, there are various ways to perform the interlacing to create the composite image. For example, the intermediate images can be divided into the requisite number of slices (such as by pixel columns), and every n$^{th}$ column of n images can be selected to produce the interlaced image. For example, with two source images, every other slice of each intermediate image is selected to generate the composite image. In another example, with four intermediate images: the first slice of the composite image will be the first slice from the first intermediate image, the second composite slice will be the first slice of the second intermediate image, the third composite slice will be the first slice of the third intermediate image, the fourth composite slice will be the first slice of the fourth intermediate image, the fifth composite slice will be the fifth slice of the first intermediate image, the sixth composite slice will be the fifth slice of the second intermediate image, the seventh composite slice will be the fifth slice of the third intermediate image, the eight composite slice will be the fifth slice of the fourth intermediate image, and so forth.

Other ways to do the interlacing are also envisioned. For example, with four intermediate images: the first slice of the composite image will be the first slice from the first intermediate image, the second composite slice will be the second slice of the second intermediate image, the third composite slice will be the third slice of the third intermediate image, the fourth composite slice will be the fourth slice of the fourth intermediate image, the fifth composite slice will be the fifth slice of the first intermediate image, the sixth composite slice will be the sixth slice of the second intermediate image, the seventh composite slice will be the seventh slice of the third intermediate image, the eight composite slice will be the eighth slice of the fourth intermediate image, and so forth.

Various features and advantages of the invention are set forth in the following claims.

What is claimed is:

1. A method for producing a composite image that is viewable through lenticular lenses to create a special visual effect, comprising the steps of:
   storing a first source image and a second source image;
   displaying simultaneously the first and second source images and selecting two reference points E1 and E2 in the first source image and corresponding reference points E3 and E4 in the second source image;
   creating a first intermediate image including points E1 and E2 that is a version of the first source image and a second intermediate image including points E3 and E4 that is a version of the second source image, wherein the location of point E1 in the first intermediate image is the same as the location of point E3 in the second intermediate image, and the location of point E2 in the first intermediate image is the same as the location of point E4 in the second intermediate image; and
   interlacing the first intermediate image and the second intermediate image to produce a composite image.

2. The method of claim 1, wherein the step of creating a first and a second intermediate image includes translating image data to align point E1 and point E3, performing a rotation of image data around point E1 or point E3, and performing a rescaling of the image data to align point E2 and point E4.

3. The method of claim 1, wherein the first intermediate image is the same as the first source image.

4. The method of claim 3, wherein the step of creating a second intermediate image includes translating image data to create a translated data array corresponding to the second source image, such that point E3 is at a location in the translated data array that is the same as the location of point E1 in the first intermediate image, rotating the translated image data around point E3 to create a rotated data array corresponding to the second source image, such that a line defined by points E3 and E4 in the rotated data array is at a location therein that is the same as the location of a line defined by points E1 and E2 in the first intermediate image, and rescaling the rotated data array to produce the second intermediate image corresponding to the second source image, such that a line segment defined by points E3 and E4 in the second intermediate image is the same size as a line segment defined by points E1 and E2 in the first intermediate image.

5. The method of claim 1, wherein the second intermediate image is the same as the second source image.

6. The method of claim 1, wherein the source images are displayed on a computer monitor.

7. The method of claim 1, wherein the source images include faces.

8. The method of claim 7, wherein the reference points are facial features.

9. The method of claim 1, wherein the selecting step is performed by a user.

10. The method of claim 1, wherein the selecting step is performed by a user, and the creating and interlacing steps are performed by a computer program.

11. A method for producing a composite image that is viewable through lenticular lenses to create a special visual effect, comprising the steps of:
   storing a first source image in the form of a first data file and a second source image in the form of a second data file;
   displaying simultaneously the first and second source images and selecting two reference points E1 and E2 in the first source image and corresponding reference points E3 and E4 in the second source image;
   creating an intermediate image that also includes points E3 and E4 and is a version of the second image, wherein the location of point E3 in the intermediate image is the same as the location of point E1 in the first source image and the location of point E4 in the intermediate image is the same as the location of point E2 in the first source image; and
   interlacing the first source image and the intermediate image to produce a composite image.

12. The method of claim 11, wherein the source images are displayed on a computer screen.

13. The method of claim 11, wherein the source images include faces.

14. The method of claim 13, wherein the reference points are facial features.

15. The method of claim 11, wherein the selecting step is performed by a user.

16. The method of claim 11, wherein a user performs the selecting step, and a computer program performs the creating and interlacing steps.

17. The method of claim 11, wherein the interlaced image is in the form of an interlaced data file.

18. A method for producing an interlaced image viewable through lenticular lenses to create a special visual effect, comprising the steps of:
   storing a first source image as a first data array and a second source image as a second data array in a memory of a computer;
   viewing the first source image and the second source image simultaneously on a display of the computer and selecting two reference points E1 and E2 in the first image and reference points E3 and E4 in the second image, wherein point E3 corresponds to point E1 and point E4 corresponds to point E2;
   processing the second data array to create an intermediate image as an intermediate data array that also includes points E3 and E4 and is a version of the second source image, wherein the processing includes the steps of aligning point E3 with point E1 of the first source image to create an aligned image, rotating and resizing the aligned image to produce the intermediate array wherein a line segment defined by points E1 and E2 in the first data array is the same size and orientation as a line segment defined by points E3 and E4 in the intermediate data array; and interlacing the first data array and the intermediate data array to produce a composite image as an interlaced array.

19. The method of claim 1, further including the step of printing the composite image on one of a lenticular sheet and a paper sheet joinable with a lenticular sheet.

* * * * *